US012586224B2

(12) United States Patent
Im

(10) Patent No.: US 12,586,224 B2
(45) Date of Patent: Mar. 24, 2026

(54) THREE-DIMENSIONAL SCANNING SYSTEM AND METHOD FOR OPERATING SAME

(71) Applicant: MEDIT CORP., Seoul (KR)

(72) Inventor: Sung Bin Im, Seoul (KR)

(73) Assignee: MEDIT CORP., Seoul (KR)

( * ) Notice: Subject to any disclaimer, the term of this patent is extended or adjusted under 35 U.S.C. 154(b) by 114 days.

(21) Appl. No.: 18/274,147

(22) PCT Filed: Jan. 26, 2022

(86) PCT No.: PCT/KR2022/001405
§ 371 (c)(1),
(2) Date: Sep. 19, 2024

(87) PCT Pub. No.: WO2022/164203
PCT Pub. Date: Aug. 4, 2022

(65) Prior Publication Data
US 2025/0285302 A1 Sep. 11, 2025

(30) Foreign Application Priority Data

Jan. 26, 2021 (KR) ........................ 10-2021-0010848

(51) Int. Cl.
*G06T 7/521* (2017.01)
*A61C 9/00* (2006.01)
(Continued)

(52) U.S. Cl.
CPC ................ *G06T 7/521* (2017.01); *G06T 7/55* (2017.01); *G06T 7/90* (2017.01); *H04N 13/254* (2018.05);
(Continued)

(58) Field of Classification Search
CPC .. G06T 7/521; G06T 7/55; G06T 7/90; G06T 2207/10024; G06T 2207/10152;
(Continued)

(56) References Cited

U.S. PATENT DOCUMENTS 9,041,914 B2   5/2015 Tohme et al.
10,695,150 B2   6/2020 Kopelman et al.
(Continued)

FOREIGN PATENT DOCUMENTS

CN        107797361 B      10/2020
JP        2002-323376 A    11/2002
(Continued)

OTHER PUBLICATIONS

Extended European Search Report dated Jan. 31, 2025 in Application No. 22746229.8.
(Continued)

*Primary Examiner* — Shahan Ur Rahaman
(74) *Attorney, Agent, or Firm* — Sughrue Mion, PLLC

(57) ABSTRACT

A three-dimensional scan system and an operating method thereof are provided. Embodiments of the present disclosure provide a method and a three-dimensional scan system for analyzing property information of an object from at least one image obtained by imaging an object to which light is projected, and automatically changing the color of a light source projecting light to the object based on the analyzed property information.

15 Claims, 9 Drawing Sheets

< COLOR IMAGE OF OBJECT >        < R,G,B COLOR HISTOGRAM >

(51) Int. Cl.
    *G06T 7/55*         (2017.01)
    *G06T 7/90*         (2017.01)
    *H04N 13/254*      (2018.01)

(52) U.S. Cl.
    CPC .... *A61C 9/006* (2013.01); *G06T 2207/10024*
        (2013.01); *G06T 2207/10152* (2013.01); *G06T*
        *2207/20072* (2013.01); *G06T 2207/30036*
                      (2013.01)

(58) Field of Classification Search
    CPC ......... G06T 2207/20072; G06T 2207/30036;
               H04N 13/254; A61C 9/006; A61C
               9/0053; A61C 13/0004; A61B 1/00172;
               A61B 1/0653; A61B 1/247; A61B
               1/00193; A61B 1/0615; A61B 1/24;
                          G01B 11/2509
    See application file for complete search history.

(56)             References Cited

U.S. PATENT DOCUMENTS

| | | |
|---|---|---|
| 11,444,006 B2 | 9/2022 | Hatori et al. |
| 2007/0091174 A1 | 4/2007 | Kochi et al. |
| 2010/0311005 A1* | 12/2010 | Liang ................. G01B 11/2527 |
| | | 433/29 |

| | | |
|---|---|---|
| 2015/0319326 A1 | 11/2015 | Pfeiffer et al. |
| 2015/0339808 A1* | 11/2015 | Tsuda ........................ G06T 5/40 |
| | | 382/167 |
| 2019/0301858 A1* | 10/2019 | Margaria ............... G06V 20/64 |
| 2021/0140763 A1* | 5/2021 | Pesach ................. A61B 5/0088 |
| 2021/0264629 A1* | 8/2021 | Swope ................... G06T 7/521 |

FOREIGN PATENT DOCUMENTS

| | | |
|---|---|---|
| JP | 2012-152333 A | 8/2012 |
| KR | 10-2012-0012191 A | 2/2012 |
| KR | 10-2016-0147980 A | 12/2016 |
| KR | 10-2018-0104246 A | 9/2018 |
| KR | 10-2019-0022941 A | 3/2019 |
| WO | 2018/022940 A1 | 2/2018 |
| WO | 2019/185624 A1 | 10/2019 |
| WO | 2019/230284 A1 | 12/2019 |
| WO | 2020/173955 A1 | 9/2020 |

OTHER PUBLICATIONS

International Search Report for PCT/KR2022/001405 dated May 9, 2022 [PCT/ISA/210].
Korean Decision on Registration for 10-2021-0010848 dated Mar. 24, 2023.
Korean Office Action for 10-2021-0010848 dated Sep. 13, 2023.

* cited by examiner

① OBTAINING R,G,B COLOR IMAGES BY SEQUENTIALLY
PROJECTING LIGHTS OF R,G,B LIGHT SOURCES

< COLOR IMAGE OF OBJECT >                  < R,G,B COLOR HISTOGRAM >

THREE-DIMENSIONAL SCANNING SYSTEM AND METHOD FOR OPERATING SAME

TECHNICAL FIELD

The present disclosure relates to a three-dimensional scan system and an operating method thereof, and more particularly, to a method and device for automatically changing a color of a light source projecting light to an object.

BACKGROUND ART

Dental computer aided design/computer aided manufacturing (CAD/CAM) technology is widely used for dental treatment, particularly prosthetic treatment and so on. The most important thing in dental treatment using the CAD/CAM technology is to obtain an accurate three-dimensional image of the shape of an object, such as a patient's tooth, gum, and jawbone. In performing dental treatment, accurate calculation may be performed by a computer when using a three-dimensional image obtained from an object.

In the dental CAD/CAM field, optical three-dimensional scanners are widely used. For example, an optical three-dimensional scanner may obtain three-dimensional surface shape information of an object by projecting light to the object, imaging light reflected from the object by using at least one camera to obtain a plurality of two-dimensional images, and processing the plurality of two-dimensional images.

In addition, the shorter the wavelength of light, the lower the transmittance of an object and the higher the reflectance of a surface, and accordingly, an optical scanner for scanning a surface contour of an object mainly uses a blue light source. Particularly, when a translucent object, such as a tooth, is scanned, the blue light source has a higher surface reflectance than a red light source or a green light source. However, when an object is scanned by using only one of the red light source, the green light source, and the blue light source, an image may not be obtained because light of a light source of a certain color is not reflected from the object depending on characteristics, such as a color, a type, or a material of the object. For example, in a case in which a tooth is scanned by projecting light of a blue light source, when there is bleeding in the tooth, the light of the blue light source is not reflected because the bleeding part is red, and accordingly, an image of the bleeding part may not be obtained. When a light source according to characteristics of an object is not used, the quality of a scanned image may be reduced due to omission or non-acquisition of an image.

DISCLOSURE

Technical Problem

The present disclosure provides a method and a three-dimensional scan system for automatically changing a color of a light source projecting light to an object based on property information obtained from at least one image of the object in obtaining a three-dimensional image by scanning the object.

Technical Solution

According to an embodiment of the present disclosure, a three-dimensional scan system includes a light projector configured to project light to an object, an image capturer configured to obtain at least one image of the object, a data analyzer configured to analyze property information of the object from the at least one image, and a controller configured to control the light projector to change a color of a light source based on the analyzed property information.

Also, in the embodiment of the present disclosure, the property information may include information of at least one of a color and a shape of the object.

Also, in the embodiment of the present disclosure, the light projector may project red (R) light, green (G) light, and blue (B) light, or white light to the object by using an R light source, a G light source, and a B light source, or a white light source, the image capturer may obtain an image by imaging light reflected from the object, and the controller may obtain information of a color of the object by analyzing the image.

Also, in the embodiment of the present disclosure, the controller may obtain a color histogram from the at least one image, obtain information of a color having a greatest cumulative distribution ratio of image pixels among red, green, and blue, by analyzing the color histogram, and control the light projector to change a light source corresponding to the color having the greatest cumulative distribution ratio of image pixels among B, G, and B.

Also, in the embodiment of the present disclosure, the image capturer may obtain a plurality of two-dimensional image frames by imaging the object, and the controller may control the light projector to project the R light, the G light, and the B light after obtaining the plurality of two-dimensional image frames and obtain, through the image capturer, the plurality of two-dimensional image frames respectively corresponding to the R light, the G light, and the B light.

Also, in the embodiment of the present disclosure, the image capturer may obtain a plurality of image frames by imaging the object, and the controller may detect a shape of the object by analyzing at least one image frame among the plurality of image frames and control the light projector to change the color of the light source based on the detected shape of the object.

Also, in the embodiment of the present disclosure, the color of the light source may be predetermined according to the shape of the object.

Also, in the embodiment of the present disclosure, the controller may recognize a shape of an object having a greatest area ratio among objects included in a region of interest set in the plurality of image frames.

According to another embodiment of the present disclosure, an operating method of a three-dimensional scan system includes obtaining at least one image of an object by projecting light to the object by using a light source, analyzing property information of the object from the obtained at least one image; and changing a color of the light source projecting light to the object based on the analyzed property information.

Also, in the embodiment of the present disclosure, the property information may include information of at least one of a color and a shape of the object.

Also, in the embodiment of the present disclosure, the obtaining of the at least one image may comprise obtaining images by projecting red (R) light, green (G) light, and blue (B) light, or white light to the object by using an R light source, a G light source, and a B light source, or a white light source, and the analyzing of the property information may comprise analyzing information of the color of the object by analyzing the images.

Also, in the embodiment of the present disclosure, the analyzing of the property information may comprise obtaining a color histogram from the image, and obtaining information of a color having a greatest cumulative distribution ratio of image pixels among the R light, the G light, and the B light by analyzing the color histogram, and the changing of the color of the light source may comprise changing a light source corresponding to a color having the greatest cumulative distribution ratio of image pixels among the R light, the G light, and B light.

Also, in the embodiment of the present disclosure, the operating method may further comprise obtaining a plurality of two-dimensional image frames by imaging the object, wherein the obtaining of the images respectively corresponding to the R light, the G light, and the B light may be performed after the plurality of two-dimensional image frames are obtained.

Also, in the embodiment of the present disclosure, the operating method may further comprise obtaining a plurality of image frames by imaging the object, and detecting the shape of the object by analyzing at least one image frame among the plurality of image frames, wherein the changing of the color of the light source may comprise changing the color of the light source based on the detected shape of the object.

Also, in the embodiment of the present disclosure, the color of the light source may be predetermined according to the shape of the object.

Also, in the embodiment of the present disclosure, the detecting of the shape of the object may comprise recognizing a shape of an object having a greatest area ratio among objects included in a region of interest set in the at least one image frame.

Advantageous Effects

A three-dimensional scan system and an operating method thereof according to the disclosed embodiments may reduce unobtained or missing images and increase the quality and accuracy of a three-dimensional image, by automatically changing the color of a light source projecting light to an object based on property information of the object.

DESCRIPTION OF DRAWINGS

The present disclosure may be easily understood from the following detailed description and the accompanying drawings, wherein reference numerals denote constituent elements.

BEST MODE

Mode for Invention

Figure 1:
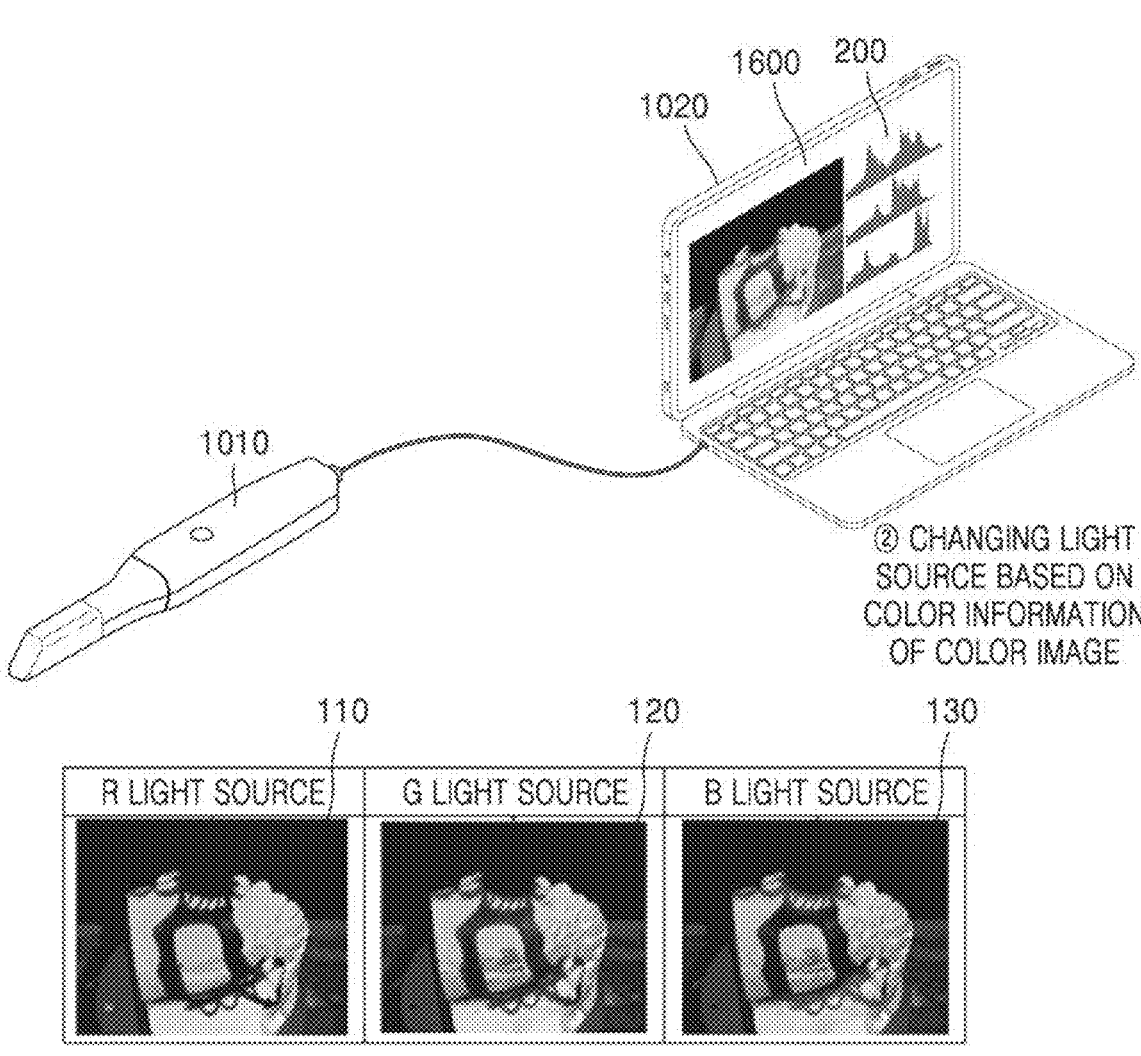
FIG. 1 is a conceptual view illustrating an operating method of a three-dimensional scan system according to an embodiment of the present disclosure.

The terms used in the embodiments of the present disclosure are selected from general terms that are currently widely used as much as possible while considering functions of the present disclosure, but may be changed depending on intention or precedent of a person skilled in the art, the emergence of new technologies, and the like. Also, there is also a term randomly selected by the applicant in a certain case, and in this case, the meaning is described in detail in the description of the corresponding embodiment. Therefore, the terms used in the present disclosure should be defined based on meanings of the terms and the entire content of the present disclosure, not a simple names of the terms.

A singular expression may include plural expressions unless the context clearly states otherwise. The terms used herein, including technical or scientific terms, may have the same meanings as commonly understood by those skilled in the art described herein.

When it is said that a certain portion "includes" a certain constituent element throughout the present disclosure, this means that the certain portion may further include other constituent elements, not excluding other constituent elements unless otherwise stated. In addition, the terms, such as " . . . unit" and " . . . module" described herein mean a unit that processes at least one function or operation, which is implemented by hardware or software or a combination of hardware and software.

The phrase "configured to (or set to)" used herein may be used interchangeably with, for example, "suitable for", "having the capacity to", "designed to", "adapted to", "made to", or "capable of" depending on situations. The term "configured (or set) to" may not necessarily mean only "specifically designed to" in hardware. Instead, in some contexts, the phrase "a system configured to" may mean that the system "is capable of" in conjunction with other devices or components. For example, the phrase "a processor configured (or set) to perform A, B, and C" may indicate a dedicated processor (for example, an embedded processor) for performing corresponding operations or a general-purpose processor (for example, a central processing unit (CPU) or an application processor) capable of performing corresponding operations by executing one or more software programs stored in a memory.

In the present disclosure, an 'image' may indicate a two-dimensional image of an object or a three-dimensional image representing the object in a three dimension. The three-dimensional image may be in the form of a point cloud or a polygon mesh.

Also, in the present disclosure, an 'image' may indicate information required to represent an object in a two dimension or a three dimension, for example, raw data obtained by using at least one camera. Specifically, the raw data is two-dimensional data or three-dimensional data obtained to generate a three-dimensional image of an object and may be data (for example, two-dimensional data) obtained by at least one camera included in a scanner when the object is scanned by using a three-dimensional scanner.

In the present disclosure, a 'three-dimensional scanner' may include an intraoral scanner, a table scanner, a computed tomography (CT) scanner, and the like.

In the present disclosure, an 'object' is a target to be imaged and may include a human, an animal, or a part thereof. For example, the object may include a body part (organ or so on), an artificial structure attachable on or insertable into the object, a phantom, or so on. Hereinafter, a case in which a three-dimensional image of an oral cavity or a plaster model including at least one tooth is obtained as an object is described as an example. For example, the object may include a tooth, gingiva, at least a part of the oral cavity, artificial structures (for example, orthodontic devices including a bracket and a wire, implants, artificial teeth, dental restorations including an inlay and an onlay, orthodontic aids to be inserted into the oral cavity, or so on), and/or so on. However, the present disclosure is not limited to obtaining a three-dimensional image of the oral cavity and may be applied to obtain three-dimensional images of various objects.

Hereinafter, embodiments are described in detail with reference to drawings.

FIG. 1 is a conceptual view schematically illustrating an operating method of a three-dimensional scan system 1000 according to an embodiment of the present disclosure.

In the embodiment illustrated in FIG. 1, the three-dimensional scan system 1000 according to an embodiment of the present disclosure may include a three-dimensional scanner 1010 and a processing device 1020.

The three-dimensional scanner 1010 may obtain at least one image of an object by projecting light onto the object by using a light projector 1100 and by scanning the object to which the light is projected, by using at least one camera.

Referring to FIG. 1, the three-dimensional scanner 1010 may be an intraoral scanner that is inserted into an oral cavity and scans teeth in a non-contact manner to generate a three-dimensional model of the oral cavity including at least one tooth. The three-dimensional scanner 1010 may have a shape so as to be drawn in and out of an oral cavity and may scan the inside of a patient's oral cavity by using at least one image sensor (for example, an optical camera, and so on). The three-dimensional scanner 1010 may obtain surface information of an object as raw data to image a surface of at least one of teeth in an oral cavity, gingiva in the oral cavity, and artificial structures (for example, orthodontic devices including a bracket, a wire, and so on, implants, artificial teeth, orthodontic aids to be inserted into the oral cavity, and so on) that may be inserted into the oral cavity.

The three-dimensional scanner 1010 is illustrated as an intraoral scanner in FIG. 1, but is not limited thereto. In one embodiment, the three-dimensional scanner 1010 may also be composed of a table scanner.

An image obtained by the three-dimensional scanner 1010 may be transmitted to the processing device 1020 connected thereto through a wired or wireless communication network.

The three-dimensional scanner 1010 may be connected to the processing device 1020 through a wired or wireless communication method. In one embodiment, the three-dimensional scanner 1010 may be electrically and/or physically connected to the processing device 1020 by using any one communication method of a wired local area network (LAN), Ethernet, or gigabit Ethernet (GigE). However, the present disclosure is not limited thereto, and the three-dimensional scanner 1010 may also be connected to the processing device 1020 by using a universal serial bus (USB) connection method of a USB 2.0 or USB 3.0 standard.

The processing device 1020 may generate three-dimensional data three-dimensionally representing a shape of a surface of an object by using an image received from the three-dimensional scanner 1010. The processing device 1020 may be implemented as any electronic device that may generate, process, display, and/or transmit three-dimensional data or a three-dimensional image of an object based on the received image. For example, the processing device 1020 may be a computing device, such as a smartphone, a laptop computer, a desktop computer, a personal digital assistant (PDA), or a tablet personal computer (PC), but is not limited thereto.

The three-dimensional scan system 1000 may analyze property information of an object from at least one image obtained by the three-dimensional scanner 1010, and control the light projector 1100 (see FIG. 2) to change a color of a light source projecting light to the object based on the analyzed property information.

More specifically, the three-dimensional scanner 1010 may obtain at least one image of an object by imaging a surface of the object to which light is projected, by using at least one camera (for example, an optical camera). In one embodiment, the three-dimensional scanner 1010 may obtain a red (R) image 110, a green (G) image 120, and a blue (B) image 130 by imaging an object to which light from an R light source, light from a G light source, and light from a B light source are sequentially projected, by using at least one camera. Here, the 'R image 110, G image 120, and B image 130' are respectively obtained by imaging an object to which light from the R light source is projected, by imaging the object to which light from the G light source is projected, and by imaging the object to which light from the R light source is projected.

In another embodiment, the three-dimensional scanner 1010 may obtain a color image by imaging the object to which light from a white light source is projected, by using at least one camera.

In one embodiment, the three-dimensional scanner 1010 may analyze property information of an object from at least one image, and change a color of a light source projecting light to the object based on the analyzed property information. Constituent elements included in the three-dimensional scan system 1000 and operations and/or functions of the constituent elements are described in detail with reference to FIG. 2.

Figure 2:
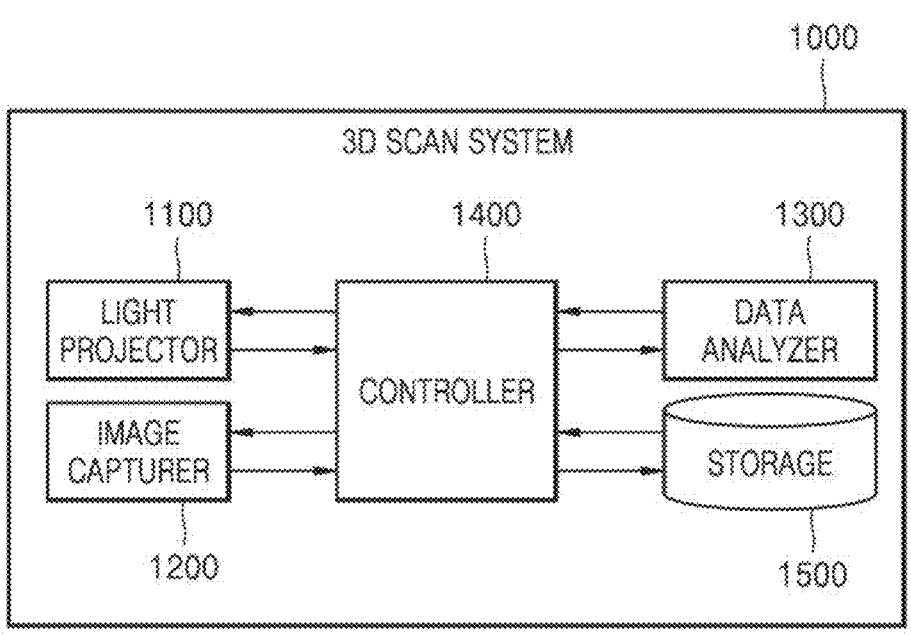
FIG. 2 is a block diagram illustrating constituent elements of a three-dimensional scan system according to an embodiment of the present disclosure.

FIG. 2 is a block diagram illustrating constituent elements of the three-dimensional scan system 1000 according to an embodiment of the present disclosure.

Referring to FIG. 2, the three-dimensional scan system 1000 may include the light projector 1100, an image capturer 1200, a data analyzer 1300, a controller 1400, and a storage 1500. In one embodiment, the three-dimensional scan system 1000 may further include a display 1600 (see FIG. 1).

The light projector 1100, the image capturer 1200, the data analyzer 1300, the controller 1400, and the storage 1500 illustrated in FIG. 2 may also be included in the three-dimensional scanner 1010 (see FIG. 1). However, the present disclosure is not limited thereto, and the light projector 1100 and the image capturer 1200 may be included in the three-dimensional scanner 1010, and the data analyzer 1300, the controller 1400, and the storage 1500 may be included in the processing device 1020.

The light projector 1100 may project light to an object. In one embodiment, the light projector 1100 may cause an R light source, a G light source, and a B light source to sequentially project R light, G light, and B light to an object. However, the present disclosure is not limited thereto, and the light projector 1100 may also project white light to an object. The light projector 1100 may be composed of a projector that projects light emitting diode (LED) light. For example, the light projector 1100 may be composed of any one of a digital light processing (DLP) projector, a liquid crystal display (LCD) projector, and a laser projector.

In one embodiment, the light projector 1100 may project a plurality of different pattern lights (structured light) to an object. For example, 12 to 14 different pattern lights may be projected to the object. However, the number of pattern lights is not limited to the above example. In another embodiment, the light projector 1100 may also project light without a pattern or structure to an object.

The image capturer 1200 may obtain at least one image by imaging an object to which R light, G light, and B light are projected by the light projector 1100. The image capturer 1200 may include one or more cameras. The camera may be a mono camera that may not obtain information of the color of light and only obtain brightness information of light. In one embodiment, at least one camera may respectively obtain an R image, a G image, and a B image by imaging an object to which an R light source, a G light source, and a B light source are sequentially projected. Here, the 'R, G, and B images' are two-dimensional (2D) images obtained by respectively imaging an object to which light from the R light source is projected, an object to which light from the G light source is projected, and an object to which light from the B light source is projected. The R image, the G image, and the B image may be respectively obtained from light reflected from an object to which light from the R light source is projected, light reflected from an object to which light from the G light source is projected, and light reflected from an object to which light from the B light source is projected The controller 1400 may obtain a color image by combining the R image, the G image, and the B image.

In another embodiment, the camera may be a color camera, and in this case, the image capturer 1200 may obtain a color image by imaging an object to which white light is projected by the light projector 1100. However, the present disclosure is not limited thereto, and the controller 1400 may obtain a color image by using images obtained by imaging an object to which white light is projected, by using a color camera.

The data analyzer 1300 obtain property information of an object by analyzing at least one image obtained from the image capturer 1200. Here, the 'property information' may include information of at least one of a color, a material, and a shape of the object.

In one embodiment, the data analyzer 1300 may obtain a color histogram of an object by analyzing at least one image. In the present specification, the 'color histogram' refers to a graph in which color information of pixels of an image is displayed on a color model. The color model may be one or more chromatic color-based color models selected from a group including an RGB model, an HSV model, a YCbCr model, and a CMYK model.

In one embodiment, when a color model is the RGB model, a horizontal axis may represent a brightness value (0 to 255) for each of R, G, and B colors, and a vertical axis may represent the number of counted pixels. Alternatively, when a color model is the HSV model, a horizontal axis may represent hue (H), saturation (S), or value (V), and a vertical axis may represent the number of counted pixels.

In another embodiment, the data analyzer 1300 may detect a shape of an object by analyzing at least one image. More specifically, the data analyzer 1300 may detect a shape of an object from an image of the object through machine learning using an artificial intelligence model, such as a pre-trained deep neural network.

The 'shape of an object' may refer to a shape or form of a body part of the object and may be classified as a preset type according to the shape or form. For example, the shape of an object may be classified as at least one of a tooth, a gum, a tongue, a lip, an artificial structure (for example, an orthodontic device including a bracket and a wire, implant, an artificial tooth, dental restorations including an inlay, an onlay, and so on, orthodontic aids to be inserted into the oral cavity, or so on), and blood. Here, the 'pre-trained deep neural network' is an artificial intelligence model that includes a plurality of layers having weights and biases and is trained by performing supervised learning that applies a plurality of pre-acquired intraoral images as an input and label values respectively corresponding to a tooth, a gum, a tongue, a lip, an artificial structure, and blood as an output. The pre-trained deep neural network model is described in detail with reference to FIG. 9.

The controller 1400 controls operations and/or functions of the light projector 1100, the image capturer 1200, and the data analyzer 1300. The controller 1400 may control the light projector 1100 to change the color of a light source projecting light to an object based on property information of the object analyzed by the data analyzer 1300.

In one embodiment, the controller 1400 may control the light projector 1100 to recognize a color having the greatest number of counted pixels in a color histogram obtained from at least one image of an object, and to change a light source of a color corresponding to the recognized color. Referring to the example illustrated in FIG. 1, when a cumulative distribution ratio of R image pixels is the greatest as a result of analysis of a color histogram 200 (see FIG. 1), the controller 1400 may control the light projector 1100 to cause the R light source to project light. In another example, when a cumulative distribution ratio of B image pixels is similar to a cumulative distribution ratio of R image pixels and a distribution ratio of the G image pixels is relatively low as a result of analysis of the color histogram 200, the controller 1400 may control the light projector 1100 to cause a purple light source to project light by combining the R light source and the B light source, or to cause the R light source to project light once and the B light source to project light once.

The controller 1400 may control the light projector 1100 to change the color of a light source based on the shape of the object detected from at least one image. In one embodiment, the controller 1400 may control the light projector 1100 to project light of a color of a predetermined light source according to the shape of the detected object. In one embodiment, data on a matching relationship between a shape of an object and a color of a light source may be stored in the storage 1500 in the form of a look up table (LUT). The controller 1400 may obtain information of the color of a predetermined light source according to the shape of an object by accessing the LUT stored in the storage 1500, and change the color of the light source projecting light to the object by using the light projector 1100. The matching relationship between the shape of an object and the color of a light source may be predetermined according to characteristics including at least one of a material, reflectance, brightness, and chroma according to the shape of the object.

For example, when an object detected from an image is a 'tooth', the controller 1400 may control the light projector 1100 to cause the predetermined B light source to project light to the tooth.

When the color of a light source that matches the shape of an object is not stored in the look-up table as a result of searching the look-up table, the controller 1400 may control the light projector 1100 to cause a light source of a color set as a default to project light. A color of the default light source may be, for example, the B light source with a high surface reflectance. For example, when an object detected from at least one image is a 'tooth made of a plaster model', the controller 1400 may not obtain information of the color of a light source matching the 'plaster model' as a search result of the look-up table, and accordingly, the light projector 1100 may be controlled to cause the B light source, which is the default light source, to project light.

In one embodiment, the controller 1400 may obtain both color information and shape information of an object from at least one image, but may apply a weight to the color information to change or select the color of a light source. For example, when it is determined to change to the R light source based on the color information of an object but it is determined to change to the B light source based on the shape information of the object, the controller 1400 may change a light source to the R light source by applying the weight to the color information.

The controller 1400 may control the light projector 1100 to project light according to a color of the changed light source and may scan an object by using the image capturer 1200. The controller 1400 may generate three-dimensional data of an object by combining one or more images obtained by the image capturer 1200. The controller 1400 may generate a three-dimensional image of an object by rendering the three-dimensional data.

In one embodiment, the controller 1400 may obtain color information while rendering a three-dimensional image of a first frame by combining one or more images and change a color of the light source. Here, 'at least one image' may be a plurality of image frames obtained by the image capturer 1200. The plurality may be, for example, 12 to 14, but is not limited thereto.

The plurality of image frames may include a plurality of images for obtaining pattern information of an object and include an R image, a G image, and a B image obtained when R, G, and B light sources project light to obtaine color information. After the previously obtained first frame, the controller 1400 may control the light projector 1100 to cause the changed light source to project light to an object in order to imaging a plurality of image frames for rendering a three-dimensional image of a second frame. For example, when a time period required to obtain a plurality of two-dimensional image frames obtained to generate a three-dimensional image of the first frame is referred to as a first time period, the controller 1400 may analyze property information of an object obtained during the first time period and generate a three-dimensional image of the second frame by controlling the light projector 1100 to cause the changed light source to project light to the object based on the property information. The three-dimensional image of the second frame may be obtained by combining and rendering the plurality of two-dimensional image frames obtained as a result of projecting light from the changed light source.

In one embodiment, when obtaining a plurality of image frames, the controller 1400 may control the light projector 1100 to first obtain a plurality of image frames for obtaining pattern information and obtain R, G, and B images for obtaining color information after the plurality of image frames are obtained. The controller 1400 may control the light projector 1100 to change the color of a light source for forming the three-dimensional image of the second frame by obtaining the color information from the obtained R, G, and B images. A specific embodiment of a sequence of obtaining the R, G, and B images and a change in the color of a light source for each frame are described in detail with reference to FIG. 6.

The data analyzer 1300 and the controller 1400 may each be implemented by a hardware device including a processor and a memory. At least one instruction or program code related to an operation and/or a function of the three-dimensional scan system 1000 may be stored in the memory, and the at least one instruction or program code stored in the memory may be executed by a processor. The processor may control components included in the three-dimensional scan system 1000 to perform an intended operation and/or function by executing at least one instruction or program code. The processor may be implemented by a system on chip (SoC) in which a core (not illustrated) is integrated with a graphics processing unit (GPU) (not illustrated). However, the present disclosure is not limited thereto, and the processor may also include at least one of a central processing unit, a microprocessor, a digital signal processor (DSP), a digital signal processing device (DSPD), a programmable logic device (PLD), and a field programmable gate array (FPGA).

The storage 1500 is a storage medium that stores data (for example, raw data, a color image, a two-dimensional image, a three-dimensional image, and so on obtained through scanning of an object). The storage unit 1500 may store a three-dimensional image three-dimensionally representing an object. In one embodiment, the storage 1500 may store data about a predetermined matching relationship between the shape of an object and the color of a light source in the form of a look-up table (LUT).

The storage 1500 may be composed of a non-volatile memory. The non-volatile memory refers to a storage medium that may store and maintain information even when power is not supplied and use the stored information again when power is supplied. The non-volatile memory may include at least one of, for example, a flash memory, a hard disk, a solid state drive (SSD), a read only memory (ROM), a magnetic memory, a magnetic disk, and an optical disk.

In FIG. 2, the storage 1500 is illustrated as an element included in the three-dimensional scan system 1000, but is not limited thereto. In one embodiment, the storage 1500 may be implemented by an external constituent element not included in the three-dimensional scan system 1000, for example, a form of an external memory (for example, a multimedia card micro type, a card-type memory (for example, a secure digital (SD) memory, an extended digital (XD) memory, or so on) or a constituent element included in a server.

Although not illustrated in FIG. 2, the three-dimensional scan system 1000 may further include the display 1600 (see FIG. 1). The display 1600 may display a preset screen under control by the controller 1400. In one embodiment, the display 1600 may display a three-dimensional image of an object generated by the controller 1400. Also, the display 1600 may display a user interface screen including a three-dimensional image. Alternatively, the display 1600 may display a user interface screen including information of diagnosis and treatment of an object.

The display 1600 may include at least one of, for example, a liquid crystal display, a thin film transistor-liquid crystal display, an organic light-emitting diode, a flexible display, a three-dimensional display, and an electrophoretic display.

In addition, in the related art, a blue (B) light source is mainly used for an optical scanner for scanning a surface contour of an object. Particularly, when scanning a translucent object, such as a tooth, a B light source with better surface reflection is used to project light and obtain a three-dimensional image of an object because the B light source has a higher surface reflectance than the red (R) light source or a green (G) light source. However, there is a problem in that, when an object is scanned by using only one of the R, G, and B light sources, an image may not be obtained because light of a light source of a certain color is not reflected according to characteristics, such as a color, a type, and a material of the object. For example, when a tooth is scanned by light projected from the B light source, and when there is bleeding in the tooth, light from the B light source is not reflected because the bleeding part is red, and accordingly, an image of the bleeding part may not be obtained. When a light source according to characteristics of an object is not used, the quality of a scanned image may be reduced due to omission or non-acquisition of the image.

The three-dimensional scan system 1000 according to the embodiment of the present disclosure may analyze property information of an object from at least one image of the object, automatically change the color of a light source based on the property information, prevent omission or non-acquisition of an image by using a surface reflectance according to the color of light, and increase the quality and accuracy of a finally rendered three-dimensional image. In addition, the three-dimensional scan system 1000 according to the embodiment of the present disclosure may detects the shape of an object by using an artificial intelligence model, scan the object by using the light source of a color predetermined according to the detected shape of the object, and accordingly, when cumulative distributions of RGB image pixels are similar to each other or when the surface reflectance is uniform for all colors, a higher quality image may be obtained compared to a method of using only color information.

Figure 3:
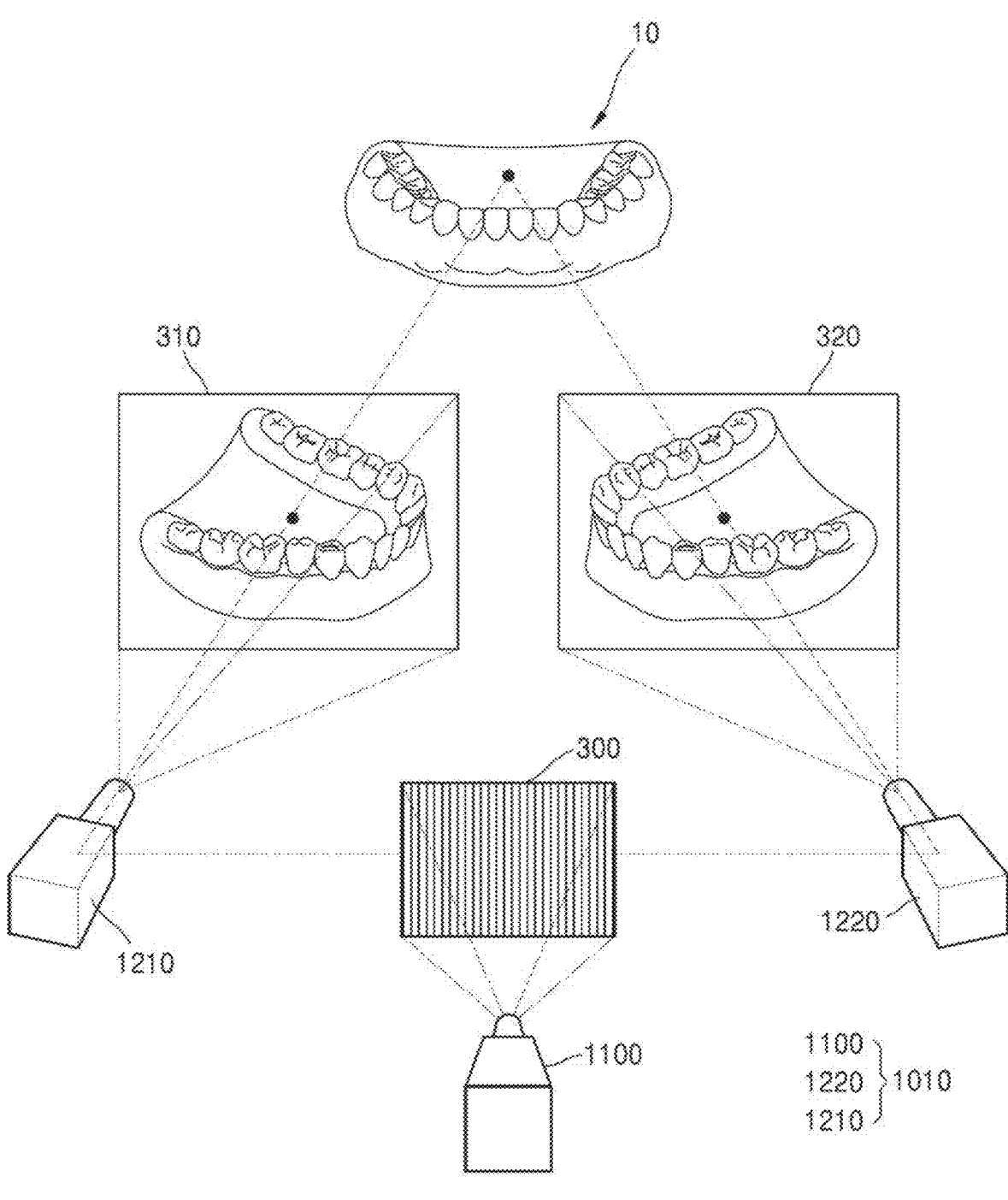
FIG. 3 is a view illustrating a method of obtaining surface data of an object by using a three-dimensional scan system, according to an embodiment of the present disclosure.

FIG. 3 is a view illustrating a method of obtaining surface data by using the three-dimensional scanner 1010 of an optical type according to an embodiment of the present disclosure.

In order to obtain three-dimensional data on a surface of an object by using the three-dimensional scanner 1010 according to the embodiment, a method of a structured light with stereo vision may be used. However, this is an example of the method of obtaining three-dimensional data, and the method of obtaining three-dimensional data according to the embodiment of the present disclosure is not limited to the method of structured light with stereo vision.

The three-dimensional scanner 1010 according to the embodiment may include one or more cameras 1210 and 1220 and at least one light projector 1100 that may project structured light (or pattern light) 300. FIG. 3 illustrates that the three-dimensional scanner 1010 includes two cameras 1210 and 1220, but is not limited thereto. In one embodiment, the three-dimensional scanner 1010 may include one camera or three or more cameras.

In one embodiment, the light projector 1100 may include any one of a digital light processing (DLP) projector, an LCD projector, and a laser projector. The three-dimensional scanner 1010 according to the embodiment may project the structured light 300 to an object 10, and obtain an L image 310 corresponding to a left field of view and an R image 320 corresponding to a right field of view respectively from a first camera 1210 corresponding to the left field of view and a second camera 1220 corresponding to the right field of view. The three-dimensional scanner 1010 may consecutively obtain images including the L image 310 and the R image 320 of the object 10. The three-dimensional scanner 1010 or the processing device 1020 may reconstruct a three-dimensional image frame representing a surface shape of an object from an image including the L image 310 and the R image 320.

The three-dimensional scanner 1010 or the processing device 1020 may obtain a plurality of three-dimensional image frames from a plurality of images.

The processing device 1020 may reconstruct all three-dimensional data of an object by combining the plurality of images and performing optical triangulation on the combined images. The processing device 1020 may generate a three-dimensional image by rendering the three-dimensional data and display the three-dimensional image on the display 1600 (see FIG. 1).

Although FIG. 3 illustrates that three-dimensional data is reconstructed by using an optical triangulation method, the present disclosure is not limited thereto, and the three-dimensional data may be reconstructed by using a confocal method.

Figure 4:
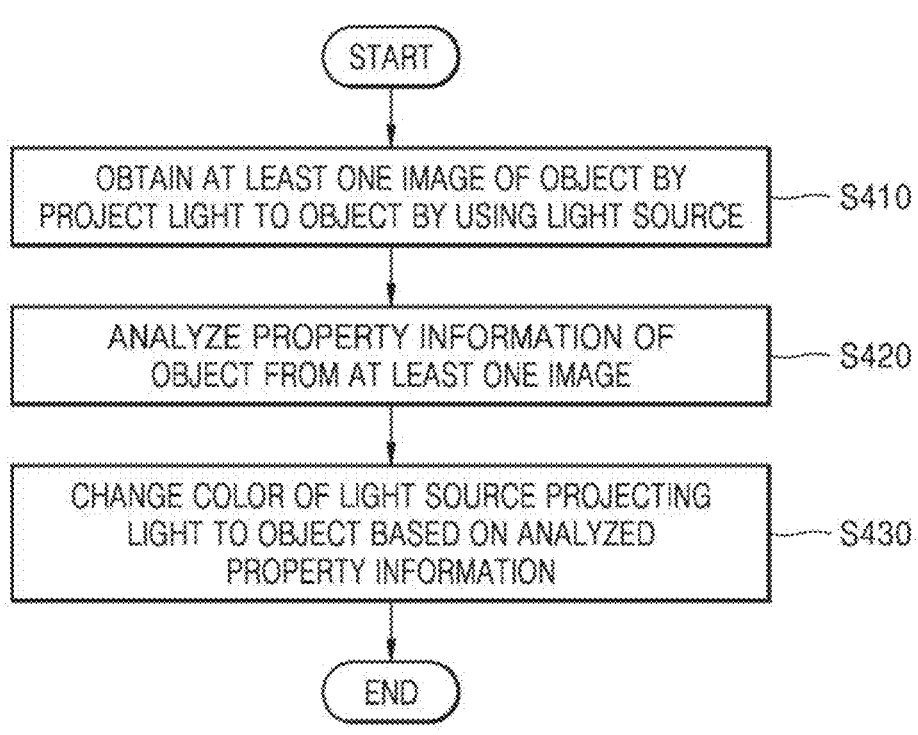
FIG. 4 is a flowchart showing an operating method of a three-dimensional scan system according to an embodiment of the present disclosure.

FIG. 4 is a flowchart showing an operating method of the three-dimensional scan system 1000, according to an embodiment of the present disclosure.

In operation S410, the three-dimensional scan system 1000 projects light to an object by using a light source and obtains at least one image of the object. In one embodiment, the three-dimensional scan system 1000 may project light to the object by using light sources of R, G, and B colors, obtain R, G, and B images by imaging light reflected from the object, and obtain a color image by combining the R, G, and B images. However, the present disclosure is not limited thereto, and the three-dimensional scan system 1000 may obtain a color image by projecting white light to the object and imaging the object by using a color camera.

In operation S420, the three-dimensional scan system 1000 analyzes property information of the object from at least one image. In one embodiment, the three-dimensional scan system 1000 may obtain color information by analyzing R, G, and B images. The three-dimensional scan system 1000 may obtain a color histogram representing a cumulative distribution according to image pixel values of each of the R, G, and B colors by analyzing the R, G, and B images. In one embodiment, the color histogram may include an R histogram representing a cumulative distribution of R image pixels of an R image, a G histogram representing a cumulative distribution of G image pixels of a G image, and a B histogram representing a cumulative distribution of B image pixels of a B image. In another embodiment, the three-dimensional scan system 1000 may obtain a R, G, and B color histogram from a color image obtained by using a color camera. The three-dimensional scan system 1000 may obtain information of a color having the greatest cumulative distribution ratio of the R, G, and B image pixels by analyzing the color histogram.

In one embodiment, the three-dimensional scan system 1000 may detect a shape of the object by analyzing the obtained two-dimensional image frame. In one embodiment, the three-dimensional scan system 1000 may detect the shape of the object from the two-dimensional image frame of the object through machine learning using a pre-trained deep neural network. The 'shape of an object' refers to the shape and form of a body part of the object, and may be classified as a preset type according to the shape and form.

For example, the shape of an object may be classified as at least one of a tooth, a gum, a tongue, a lip, an artificial structure (for example, an orthodontic device including a bracket and a wire, implant, an artificial tooth, dental restorations including an inlay, an onlay, and so on, orthodontic aids to be inserted into the oral cavity, or so on), and blood.

In operation S430, the three-dimensional scan system 1000 changes the color of a light source projecting light to the object based on the analyzed property information. In one embodiment, the three-dimensional scan system 1000 may change a color of a light source corresponding to the color having the greatest cumulative distribution ratio of the R, G, and B image pixels. For example, when the cumulative distribution ratio of R image pixels is the greatest as a result of analyzing the color histogram, the three-dimensional scan system 1000 may control the light projector 1100 (see FIGS. 1 and 2) to change a light source to the R light source and cause the changed R light source to project light.

In one embodiment, the three-dimensional scan system 1000 may cause a predetermined light source to project light according to the detected shape of the object. In one embodiment, data related to a matching relationship between a shape of an object and a color of a light source may be predetermined and stored in the storage 1500 (see FIG. 2). The three-dimensional scan system 1000 may access a look-up table stored in the storage 1500 to obtain information of the color of a predetermined light source according to the shape of an object and change the color of the light source projecting light to the object by using the obtained information.

After operation S430, the three-dimensional scan system 1000 scan the object by using the changed light source. In one embodiment, the three-dimensional scan system 1000 may project light of the light source of a changed color to an object and scan the object to replace noise of data of a previous image frame or additionally obtain unobtained data.

Figure 5:
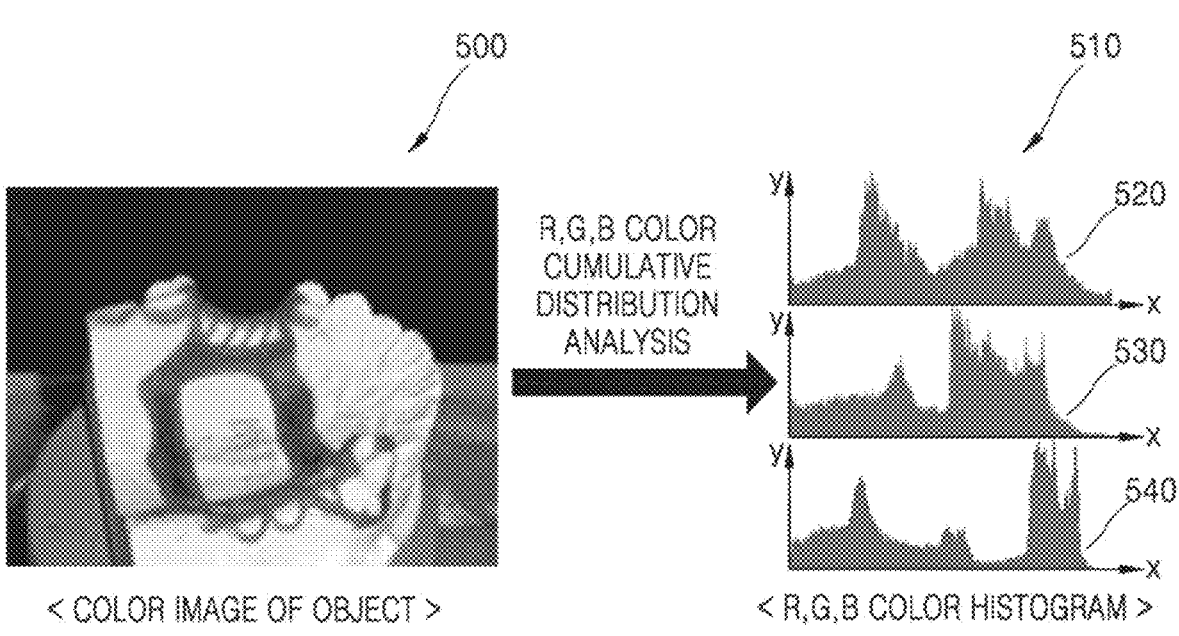
FIG. 5 is a view illustrating a method of obtaining an RGB color histogram by analyzing an image of an object by using a three-dimensional scan system, according to an embodiment of the present disclosure.

FIG. 5 is a view illustrating a method of obtaining an RGB color histogram by analyzing a color image of an object by using a three-dimensional scan system, according to an embodiment of the present disclosure.

Referring to FIG. 5, the three-dimensional scan system may obtain a color image 500 of an object by projecting light to the object and imaging the light reflected from a surface of the object. In one embodiment, the color image 500 may be a two-dimensional image generated by combining an R image obtained by projecting light of an R light source, a G image obtained by projecting light of a G light source, and a B image obtained by projecting light of a G light source. However, the present disclosure is not limited thereto. In another embodiment, the color image 500 may be a two-dimensional image obtained by projecting white light to an object and imaging the object by using a color camera.

The data analyzer 1300 (see FIG. 2) of the three-dimensional scan system 1000 may obtain a color histogram 510 representing a cumulative distribution according to image pixel values of each of R, G, and B colors by analyzing the color image 500 or the obtained R image, G image, and B image. The 'color histogram 510' is a graph in which an x-axis denotes a brightness value of an image pixel and a y-axis denotes color property of an image at coordinates representing the cumulative number of image pixels according to pixel values. In one embodiment, the color histogram 510 may include an R histogram 520 representing a cumulative distribution of R image pixels of an R image, a G histogram 530 representing a cumulative distribution of G image pixels of a G image, and a B histogram 540 representing a cumulative distribution of G image pixels of a G image.

The data analyzer 1300 may obtain information of a color having the greatest cumulative distribution ratio of image pixels among R, G, and B by analyzing the color histogram 510.

The controller 1400 may control the light projector 1100 (see FIG. 2) to change a color of a light source corresponding to the color having the greatest cumulative distribution ratio of image pixels among R, G, and B.

Figure 6:
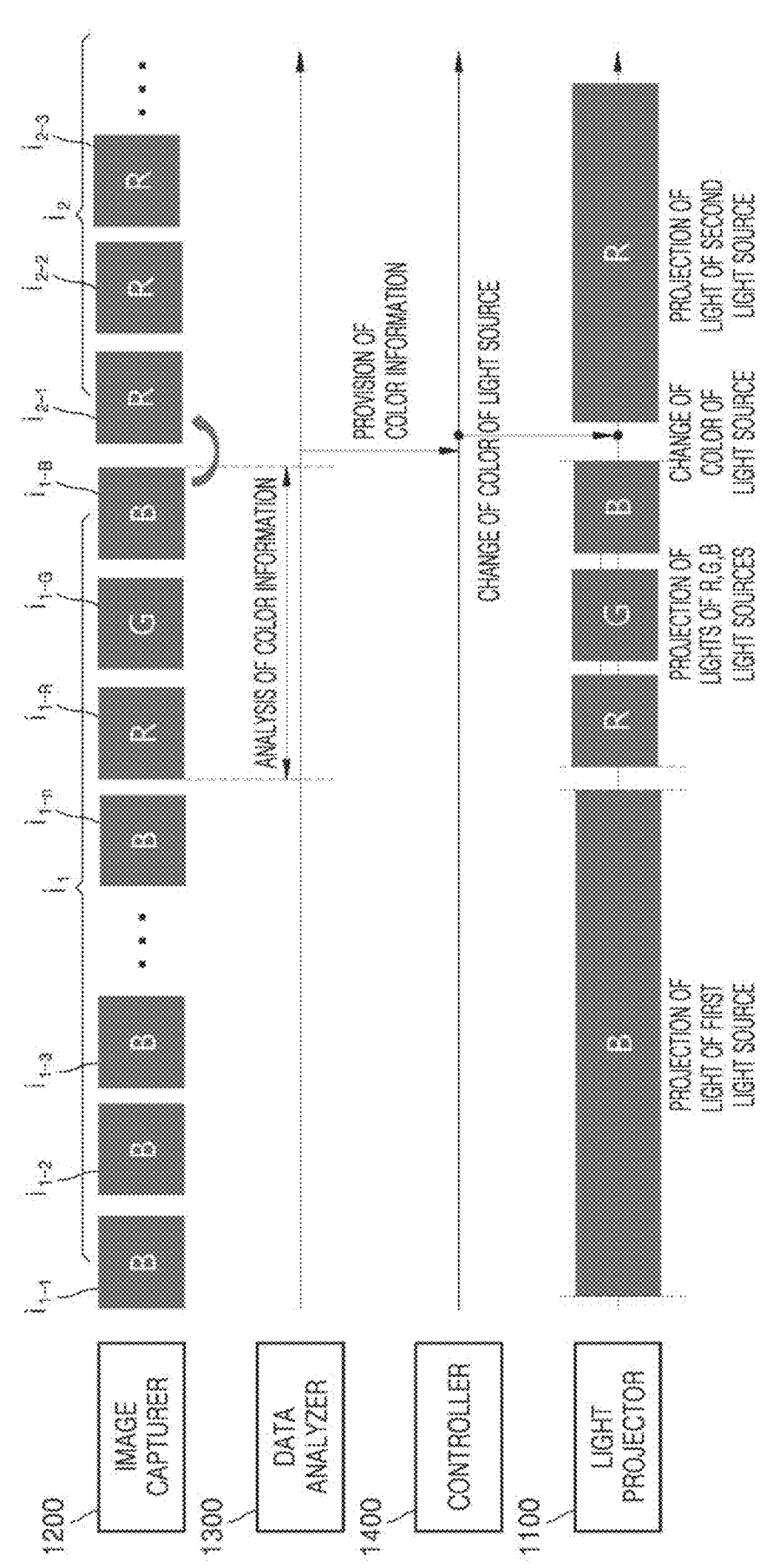
FIG. 6 is a time table illustrating a point in time when a three-dimensional scan system of the present disclosure changes a color of a light source.

FIG. 6 is a time table illustrating a point in time when the three-dimensional scan system 1000 of the present disclosure changes a color of a light source.

Referring to FIG. 6, the image capturer 1200 may obtain a plurality of image frames $i_{1\text{-}1}$ to $i_{2\text{-}3}$ by scanning an object. The plurality of image frames $i_{1\text{-}1}$ to $i_{2\text{-}3}$ may include a plurality of images $i_{1\text{-}1}$ to $i_{1\text{-}n}$ for obtaining pattern information of an object, and an R image $i_{1\text{-}R}$, a G image $i_{1\text{-}G}$, and a B image $i_{1\text{-}B}$ for obtaining color information of the object. The plurality of image frames $i_{1\text{-}1}$ to $i_{1\text{-}n}$, $i_{1\text{-}R}$, $i_{1\text{-}G}$, and $i_{1\text{-}B}$ may be a two-dimensional image for forming a three-dimensional image of one frame. In the embodiment illustrated in FIG. 6, the plurality of image frames $i_{1\text{-}1}$ to $i_{1\text{-}n}$, $i_{1\text{-}R}$, $i_{1\text{-}G}$, and $i_{1\text{-}B}$ are two-dimensional images for forming a first three-dimensional image $i_1$, and a plurality of image frames $i_{2\text{-}1}$, $i_{2\text{-}2}$, $i_{2\text{-}3}$, . . . obtained after $i_{1\text{-}B}$ are two-dimensional images for forming a second three-dimensional image $i_2$.

The R image $i_{1\text{-}R}$, the G image $i_{1\text{-}G}$, and the B image $i_{1\text{-}B}$ may be obtained after the plurality of images $i_{1\text{-}1}$ to $i_{1\text{-}n}$ for obtaining pattern information of an object are obtained. The image capturer 1200 may obtain a color image by combining the R image $i_{1\text{-}R}$, the G image $i_{1\text{-}G}$, and the B image $i_{1\text{-}B}$.

The plurality of image frames $i_{1\text{-}1}$ to $i_{1\text{-}n}$, $i_{1\text{-}R}$, $i_{1\text{-}G}$, and $i_{1\text{-}B}$ for forming a three-dimensional image of one frame may be, for example, 12 to 14, but is not limited thereto.

The plurality of image frames $i_{1\text{-}1}$ to $i_{1\text{-}n}$ for obtaining pattern information of an object may be obtained by scanning the object to which light of a first light source is projected by the light projector 1100. The first light source may be a preset default light source or a light source of a color determined based on an RGB image obtained before the first three-dimensional image in is formed. In the embodiment illustrated in FIG. 6, the first light source may be the $i_1$ light source, which is an example, but is not limited to the time table illustrated in FIG. 6.

The data analyzer 1300 may obtain color information of an object by analyzing the R image $i_{1\text{-}R}$, the G image $i_{1\text{-}G}$, and the B image $i_{1\text{-}B}$. In one embodiment, the data analyzer 1300 may obtain color information by analyzing color histograms of the R image $i_{1\text{-}R}$, the G image $i_{1\text{-}G}$, and the B image $i_{1\text{-}B}$. The data analyzer 1300 provides the color information to the controller 1400.

The controller 1400 may control the light projector 1100 to change the color of a light source based on the color information obtained from the data analyzer 1300. After the R image $i_{1\text{-}R}$, the G image $i_{1\text{-}G}$, and the B image $i_{1\text{-}B}$ for forming the first three-dimensional image $i_1$ are obtained, the controller 1400 may change the color of a light source to scan the plurality of image frames $i_{2\text{-}1}$, $i_{2\text{-}2}$, $i_{2\text{-}3}$, . . . to obtain the second three-dimensional image $i_2$. For example, when cumulative distribution ratio of R image pixels in the color histogram of the object received from the data analyzer 1300 while forming the first three-dimensional image $i_1$ is greatest, the controller 1400 may determine to change a color of a light source to a color of the R light source and may control the light projector 1100 to cause the R light source to project light during a scanning process of forming the second three-dimensional image $i_2$.

Although FIG. 6 illustrates that, after the first three-dimensional image $i_1$ is formed, the controller 1400 changes the color of a light source and scans the plurality of image frames $i_{2-1}$, $i_{2-2}$, $i_{2-3}$, . . . to obtain the second three-dimensional image $i_2$ by using the color of the changed light source, but the present disclosure is not limited thereto. In one embodiment, it takes time to receive the plurality of image frames ($i_{1-1}$ to $i_{1-n}$, the R image $i_{1-R}$, the G image $i_{1-G}$, and the B image $i_{1-B}$ from the image capturer 1200 and to analyze color information by the analyzer 1300, and accordingly, the controller 1400 may transmit a light source color change signal to the light projector 1100 after the image capturer 1200 starts to scan the plurality of image frames $i_{2-1}$, $i_{2-2}$, $i_{2-3}$, . . . for the second three-dimensional image $i_2$. The color of the light source changed by the controller 1400 may be applied to scanning of a third three-dimensional image (not illustrated) obtained after the second three-dimensional image $i_2$. That is, the color change of the light source by the controller 1400 is not performed in real time, and a delay of one frame or more may occur based on the three-dimensional image.

Unlike the time table illustrated in FIG. 6, in one embodiment of the present disclosure, the image capturer 1200 may first obtain the R image $i_{1-R}$, the G image $i_{1-G}$, and the B image $i_{1-B}$, and then, may obtain the plurality of image frames $i_{1-1}$ to $i_{1-n}$. In this case, the controller 1400 may form the second three-dimensional image $i_2$ consecutively after forming the first three-dimensional image $i_1$ and may obtain color information based on the R image $i_{1-R}$, the G image $i_{1-G}$, and the B image $i_{1-B}$ used when forming the first 3D image $i_1$, and accordingly, the color change of a light source may be applied to scanning of the third three-dimensional image (not illustrated). Because both the first three-dimensional image $i_1$ and the second three-dimensional image $i_2$ are obtained before the third three-dimensional image is scanned, in this case, a delay of 2 frames or more may occur based on the three-dimensional image. Therefore, the embodiment illustrated in FIG. 6 has an advantage in that a delay is less than in the embodiment in which the R image $i_{1-R}$, the G image $i_{1-G}$, and the B image $i_{1-B}$, are first obtained and then the plurality of image frames $i_{1-1}$ to $i_{1-n}$ are obtain, and the time required to change the color of a light source is also reduced.

Figure 7:
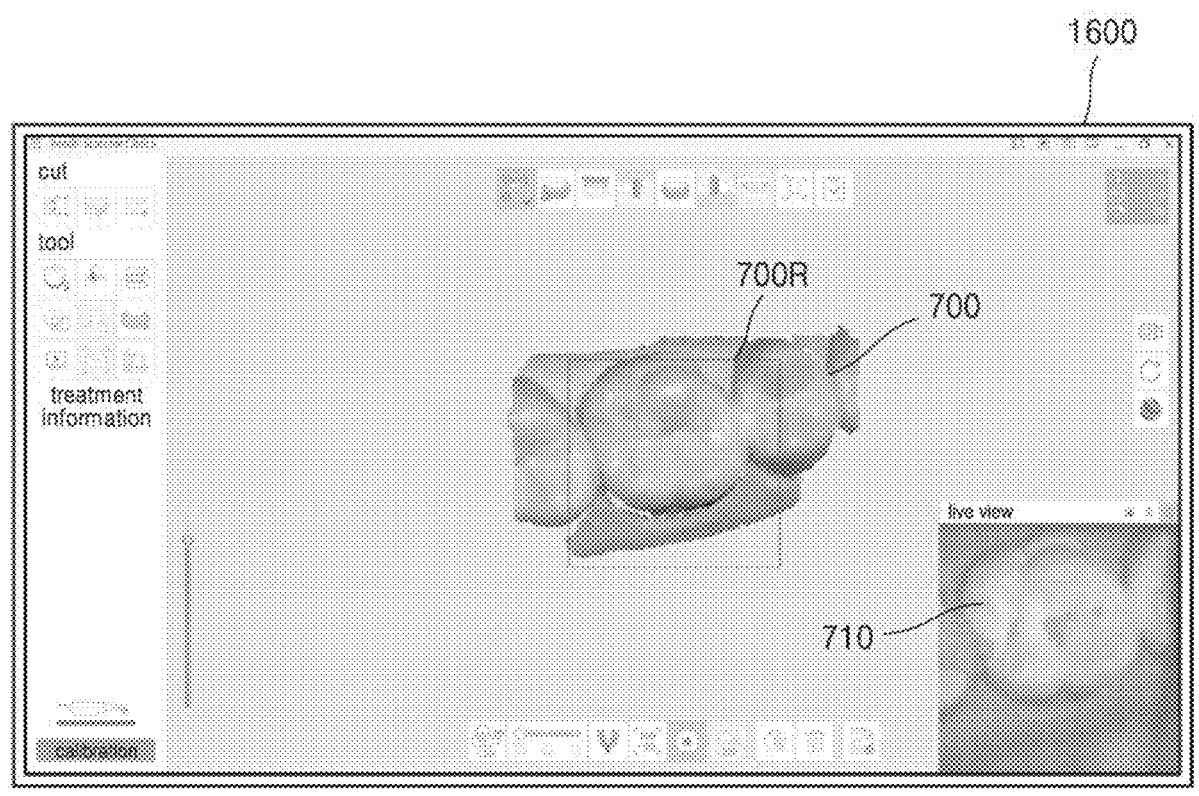
FIG. 7 is a view illustrating an embodiment in which a three-dimensional scan system of the present disclosure detects the type of an object from a displayed two-dimensional image.

FIG. 7 is a view illustrating an embodiment in which the three-dimensional scan system 1000 of the present disclosure detects the type of an object from a displayed two-dimensional image 710.

Referring to FIG. 7, the three-dimensional scan system 1000 may display a three-dimensional image 700 of an object on the display 1600. In one embodiment, the controller 1400 (see FIG. 2) of the three-dimensional scan system 1000 may set a region of interest 700R in the entire region of an object and display, on one region of the display 1600, the image 710 obtained by imaging a region included in the region of interest 700R. The image 710 of the region of interest 700R is a live view image 710 and may be generated by combining a plurality of two-dimensional images obtained by imaging the object in real time by using at least one camera.

The three-dimensional scan system 1000 may detect the shape of an object included in the displayed live view image 710. In one embodiment, the three-dimensional scan system 1000 may detect the shape of the object from the live view image 710 by using the known image processing or an object recognition model. However, the present disclosure is not limited thereto, and the three-dimensional scan system 1000 may detect the shape of the object from the live view image 710 through learning using an artificial intelligence model, such as a pre-trained deep neural network.

In one embodiment, when a plurality of shapes of an object included in the live view image 710 are recognized, the three-dimensional scan system 1000 may detect the shape of the object having the highest region ratio among the plurality of shapes of an object in the live view image 710. For example, when a tooth, a gum, and an artificial structure are all included in the live view image 710 and a region of the tooth is the greatest region, the three-dimensional scan system 1000 may detect a 'teeth' having the greatest region as the type of an object.

Figure 8:
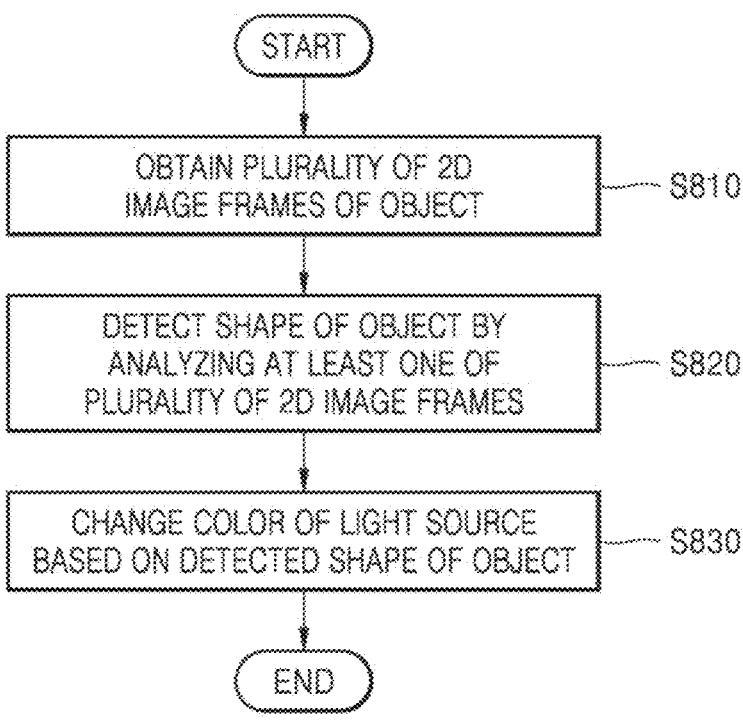
FIG. 8 is a flowchart showing a method of changing a light source based on a shape of an object by using a three-dimensional scan system, according to an embodiment of the present disclosure.

FIG. 8 is a flowchart showing a method of changing a light source based on a shape of an object by using the three-dimensional scan system 1000, according to an embodiment of the present disclosure.

In operation S810, the three-dimensional scan system 1000 obtain a plurality of two-dimensional (2D) image frames of an object. The detailed method of obtaining an image frame is the same as described above, and accordingly, redundant descriptions thereof are omitted.

In operation S820, the three-dimensional scan system 1000 detects a shape of the object by analyzing at least one two-dimensional image frame among the plurality of two-dimensional image frames. In one embodiment, the three-dimensional scan system 1000 may detect the shape of the object included in the live view image 710 (see FIG. 7) among the plurality of two-dimensional images.

In one embodiment, the three-dimensional scan system 1000 may detect the type of the object from the live view image 710 through learning using an artificial intelligence model, such as a pre-trained deep neural network model. A specific embodiment of detecting the shape of an object by using a deep neural network model is described in detail with reference to FIG. 9.

In operation S830, the three-dimensional scan system 1000 changes the color of a light source based on the detected shape of the object. In one embodiment, the color of a light source matching the shape of an object may be predetermined. In one embodiment, a matching relationship between the shape of the object and the color of the light source may be predetermined according to characteristics including at least one of a material, reflectance, brightness, and chroma according to the type of the object.

In one embodiment, data on the matching relationship between the type of the object and the color of the light source may be stored in the storage 1500 (see FIG. 2) in the form of a look-up table (LUT). In one embodiment, when the object detected from the live view image 710 is a 'tooth', the three-dimensional scan system 1000 may control the light projector 1100 to access the look-up table stored in the storage 1500 to cause the B light source, which is a predetermined light source for the tooth, to project light.

Figure 9:
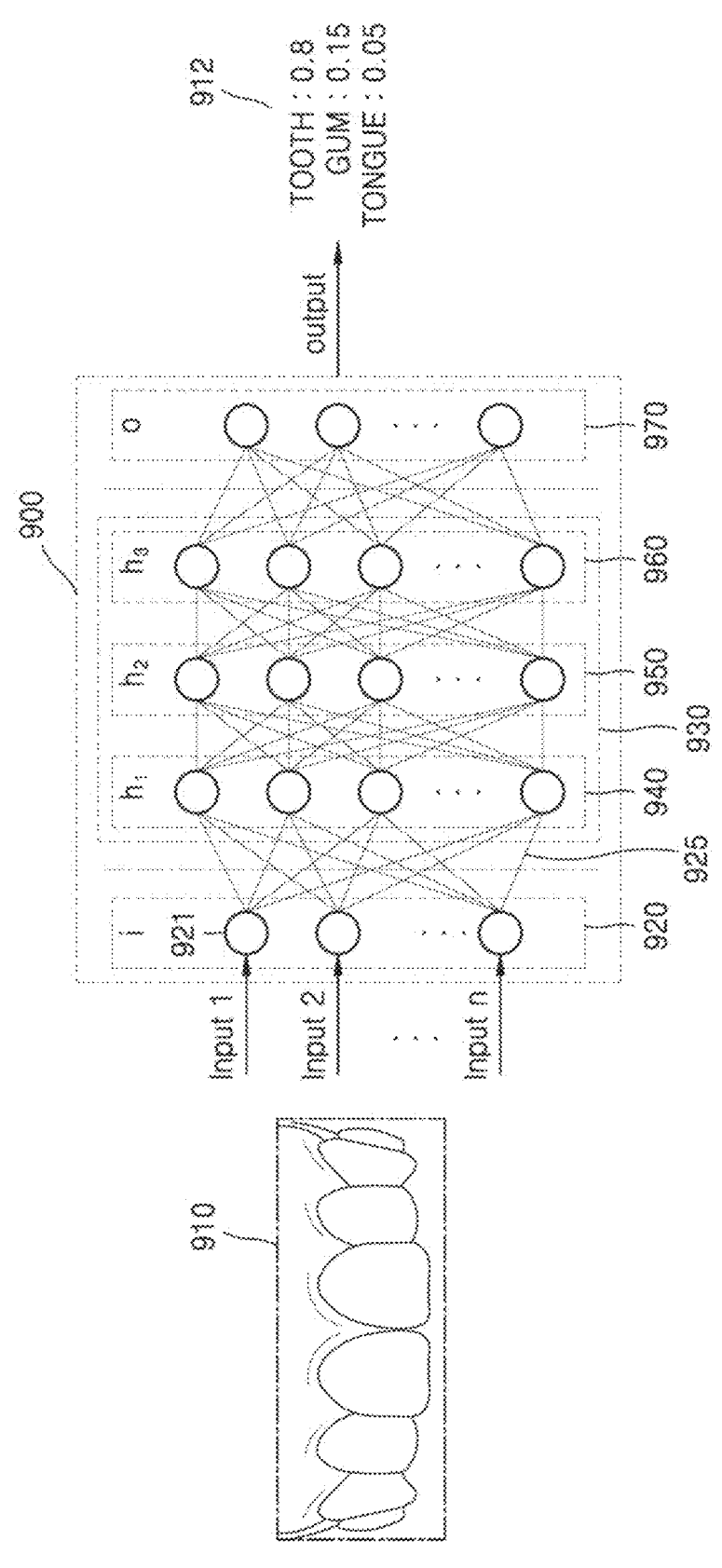
FIG. 9 is a diagram illustrating a method of detecting, by a three-dimensional scan system, a shape of an object from an intraoral image by using a neural network model, according to an embodiment of the present disclosure.

FIG. 9 is a diagram illustrating a method of detecting, by a three-dimensional scan system, a shape of an object by using a deep neural network model 900, according to an embodiment of the present disclosure.

Referring to FIG. 9, when a pre-obtained object image is input to the oral cavity, the deep neural network (DNN) model 900 may be an artificial intelligence model that provides the shape information of an object included in the object image as an output. In one embodiment, the deep neural network model 900 may be composed of a convolutional neural network (CNN) model. Here, the 'convolution neural network model' refers to a neural network that performs an operation based on a convolution operation, and may be a single neural network that collectively performs the convolution operation and other operations or a neural network in which multiple neural networks are combined.

In one embodiment, the deep neural network model 900 may be a deep neural network (DNN) that performs pixel-wise segmentation and performs a convolution operation to output data 912 related to the shape of an object from an input image 910. For example, the deep neural network model 900 may be a neural network based on a Deeplab-Mobilenet. Hereinafter, a neural network based on the Deeplab-Mobilenet is referred to as a 'Deeplab model'.

However, the present disclosure is not limited thereto, and the deep neural network model 900 may include at least one of, for example, a recurrent neural network (RNN), a restricted Boltzmann machine (RBM), a deep belief network (DBN), a bidirectional recurrent deep neural network (BRDNN), and deep Q-network.

In one embodiment, a three-dimensional scan system may implement a data recognition model through a neural network and train the implemented data recognition model by using training data. Here, the 'training data' may include images including shapes that may be classified as a preset type in the oral cavity and label values of shapes into which the images are classified. The shape of an object in the oral cavity may be classified as at least one type of, for example, a tooth, a gum, a tongue, a lip, an artificial structure (for example, an orthodontic device including a bracket and a wire, implant, an artificial tooth, dental restorations including an inlay, an onlay, and so on, orthodontic aids to be inserted into the oral cavity, or so on), and blood. The deep neural network model 900 may be an artificial intelligence model trained by applying supervised learning in which a plurality of images are applied as an input and label values respectively corresponding to a tooth, a gum, a tongue, a lip, an artificial structure, and blood are applied as a ground truth.

In the embodiment illustrated in FIG. 9, the deep neural network model 900 includes three hidden layers, but this is an example, and the number of hidden layers is not limited to three as illustrated in FIG. 9.

Referring to FIG. 9, the deep neural network model 900 includes an input layer 920, a hidden layer 930, and an output layer 970. Specifically, each of a plurality of layers forming the deep neural network model 900 may include a plurality of nodes (for example, 921) that receive data. In addition, two adjacent layers are connected to each other by a plurality of edges (for example, 925) as illustrated in FIG. 9. Each node has a corresponding weight. Accordingly, the deep neural network model 900 may obtain output data based on a value obtained by calculating (for example, performing a convolution operation, or so on) an input signal and a weight.

In a training process, training is performed in a direction from the output layer 970 to the input layer 920 to increase accuracy of the output data 912 output through the deep neural network model 900, and weights of nodes (for example, 921) forming the deep neural network model 900 may be modified to increase the accuracy of the output data 912. Therefore, the deep neural network model 900 may learn a plurality of intraoral images obtained by scanning the oral cavity before the input image 910 is input, and modify the weights of the respective nodes in a direction in which the detection accuracy of a shape of an object increases.

A plurality of nodes included in the input layer 920 of the deep neural network model 900 receive a plurality of data corresponding to the input image 910. Here, the plurality of data may be a plurality of partial images generated by performing a filtering process of segmenting the input image 910.

Through operations in a plurality of layers 940, 950, and 960 included in the hidden layer 930, Data 912 related to the shape of an object detected as a result of analyzing the input image 910 may be output from the output layer 970. The output data 912 may output a label value for the shape of the object detected as a result of analyzing the input image 910 and a probability value that may be predicted by a preset label value. In the embodiment illustrated in FIG. 9, the input image 910 is a two-dimensional image of a tooth, and the output data 912 output by analyzing the input image 910 by the deep neural network model 900 may include a probability value (0.8 in FIG. 9) that may be predicted by a tooth and a label value corresponding to the tooth, a probability value (0.15 in FIG. 9) that may be predicted by a gum and a label value corresponding to the gum, and a probability value (0.05 in FIG. 9) that may be predicted by a tongue and a label value corresponding to the tongue. In the embodiment illustrated in FIG. 9, referring to the output data 912, a 'tooth' having the greatest probability value may be determined as the shape of an object detected from the input image 910.

An operating method of the three-dimensional scan system 1000, according to an embodiment of the present disclosure, may be implemented in the form of program instructions that may be executed by various computers and recorded in a computer-readable medium. Also, according to an embodiment of the present disclosure, a computer-readable storage medium having one or more programs including at least one command for executing the operating method of the three-dimensional scan system 1000 may be provided.

The computer-readable storage medium may include program instructions, data files, data structures, and so on alone or in combination. Here, the computer-readable storage medium may include a magnetic medium, such as a hard disk, a floppy disk, on a magnetic tape, an optical medium, such as compact disk (CD)-ROM or a digital video disk (DVD), a magneto-optical medium, such as a floptical disk, and a hardware device configured to store and execute program codes, such as ROM, random access memory (RAM), or flash memory.

Here, the machine-readable storage medium may be provided in the form of a non-transitory storage medium. Here, the 'non-transitory storage medium' may indicate that a storage medium is a tangible device. Also, the 'non-transitory storage medium' may include a buffer in which data is temporarily stored.

According to one embodiment, the operating method of the three-dimensional scan system 100 according to various embodiments disclosed in the present specification may be included in a computer program product. The computer program product may be provided in the form of a machine-readable storage medium (for example, CD-ROM). In another embodiment, the operating method of the three-dimensional scan system 1000 may be distributed (downloaded or uploaded) directly or online to a user device (for example, a smartphone) or online through an application store (for example, Play Store™ or App Store™, and so on).

Although embodiments are described in detail above, the scope of the present disclosure is not limited thereto, and various modifications and improvements of those skilled in the art using the basic concept of the present disclosure defined in the following claims are also within the scope of the present disclosure.

The invention claimed is:

1. A three-dimensional scan system comprising:

a light projector configured to project red (R) light, green (G) light, or blue (B) light to an object;

an image capturer configured to obtain at least one image of the object by imaging the object to which the R light, the G light, or the B light is projected by the light projector;

a data analyzer configured to obtain a color histogram representing a cumulative distribution ratio of a number of image pixels having each of R color, G color, or B color by analyzing color information of the at least one image; and a controller configured to:

identify a color having a greatest cumulative distribution ratio of image pixels among R, G, or B, by analyzing the color histogram, and control the light projector to change a color of a light, from among the R light, the G light, or the B light, corresponding to the identified color having the greatest cumulative distribution ratio of the image pixels.

2. The three-dimensional scan system of claim 1, wherein the controller is further configured to obtain property information includes information of at least one of a color and a shape of the object by analyzing the at least one image.

3. The three-dimensional scan system of claim 1, wherein the cumulative distribution ratio of the color histogram is a ratio of the number of image pixels having each of the R color, G color, or B color relative to a total number of image pixels included in the at least one image.

4. The three-dimensional scan system of claim 1, wherein the image capturer is further configured to obtain a plurality of two-dimensional image frames by imaging the object, and the controller is further configured to control the light projector to project the R light, the G light, and the B light after acquiring the plurality of two-dimensional image frames, and obtain, through the image capturer, the plurality of two-dimensional image frames respectively corresponding to the R light, the G light, and the B light.

5. The three-dimensional scan system of claim 2, wherein the image capturer is further configured to obtain a plurality of image frames by imaging the object, and the controller is further configured to detect the shape of the object by analyzing at least one image frame among the plurality of image frames, and control the light projector to change the color of the light source based on the detected shape of the object.

6. The three-dimensional scan system of claim 5, wherein the color of the light source is predetermined according to the shape of the object.

7. The three-dimensional scan system of claim 5, wherein the controller is further configured to recognize a shape of an object having a greatest area among objects included in a region of interest set in the plurality of image frames.

8. An operating method of a three-dimensional scan system, the operating method comprising:

projecting, by using a light projector of the three-dimensional scan system, red (R) light, green (G) light, or blue (B) light to an object;

obtaining at least one image of the object by imaging the object to which the R light, the G light, or the B light is projected by the light projector;

analyzing property information of the object from the obtained at least one image; and changing a color of the light source projecting light to the object based on the analyzed property information, wherein the analyzing of the property information comprises:

obtaining a color histogram representing a cumulative distribution ratio of a number of image pixels having each of R color, G color, or B color by analyzing color information of the at least one image, and identifying a color having a greatest cumulative distribution ratio of image pixels among the R, G, or B, by analyzing the color histogram, and wherein the changing of the color of the light source comprises changing a color of the light, from among the R light, the G light, or the B light, corresponding to the identified color having the greatest cumulative distribution ratio of the image pixels.

9. The operating method of claim 8, wherein the property information includes information of at least one of a color and a shape of the object.

10. The operating method of claim 8, wherein the cumulative distribution ratio of the color histogram is a ratio of the number of image pixels having each of the R color, G color, or B color relative to a total number of image pixels included in the at least one image.

11. The operating method of claim 8, further comprising:

obtaining a plurality of two-dimensional image frames by imaging the object, wherein obtaining of the images respectively corresponding to the R light, the G light, and the B light is performed after the plurality of two-dimensional image frames are obtained.

12. The operating method of claim 9, further comprising:

obtaining a plurality of image frames by imaging the object; and detecting the shape of the object by analyzing at least one image frame among the plurality of image frames, wherein the changing of the color of the light source comprises changing the color of the light source based on the detected shape of the object.

13. The operating method of claim 12, wherein the color of the light source is predetermined according to the shape of the object.

14. The operating method of claim 12, wherein the detecting of the shape of the object comprises recognizing a shape of an object having a greatest area among objects included in a region of interest set in the at least one image frame.

15. A non-transitory computer-readable recording medium having a program recorded thereon, which includes at least one instruction for performing an operating method of a three-dimensional scan system by using a computer, the operating method comprising:

projecting, by using a light projector of the three-dimensional scan system, red (R) light, green (G) light, or blue (B) light to an object;

obtaining at least one image of the object by imaging the object to which the R light, the G light, or the B light is projected by the light projector;

analyzing property information of the object from the obtained at least one image; and changing a color of the light source projecting light to the object based on the analyzed property information,

wherein the analyzing of the property information comprises:

obtaining a color histogram representing a cumulative distribution ratio of a number of image pixels having each of R color, G color, or B color by analyzing color information of the at least one image, and identifying a color having a greatest cumulative distribution ratio of image pixels among the R, G, or B, by analyzing the color histogram, and wherein the changing of the color of the light source comprises changing a color of the light, from among the R light, the G light, or the B light, corresponding to the identified color having the greatest cumulative distribution ratio of the image pixels.

* * * * *